July 12, 1966 C. R. SUAREZ 3,260,324
MOTORIZED UNICYCLE
Filed Nov. 12, 1963
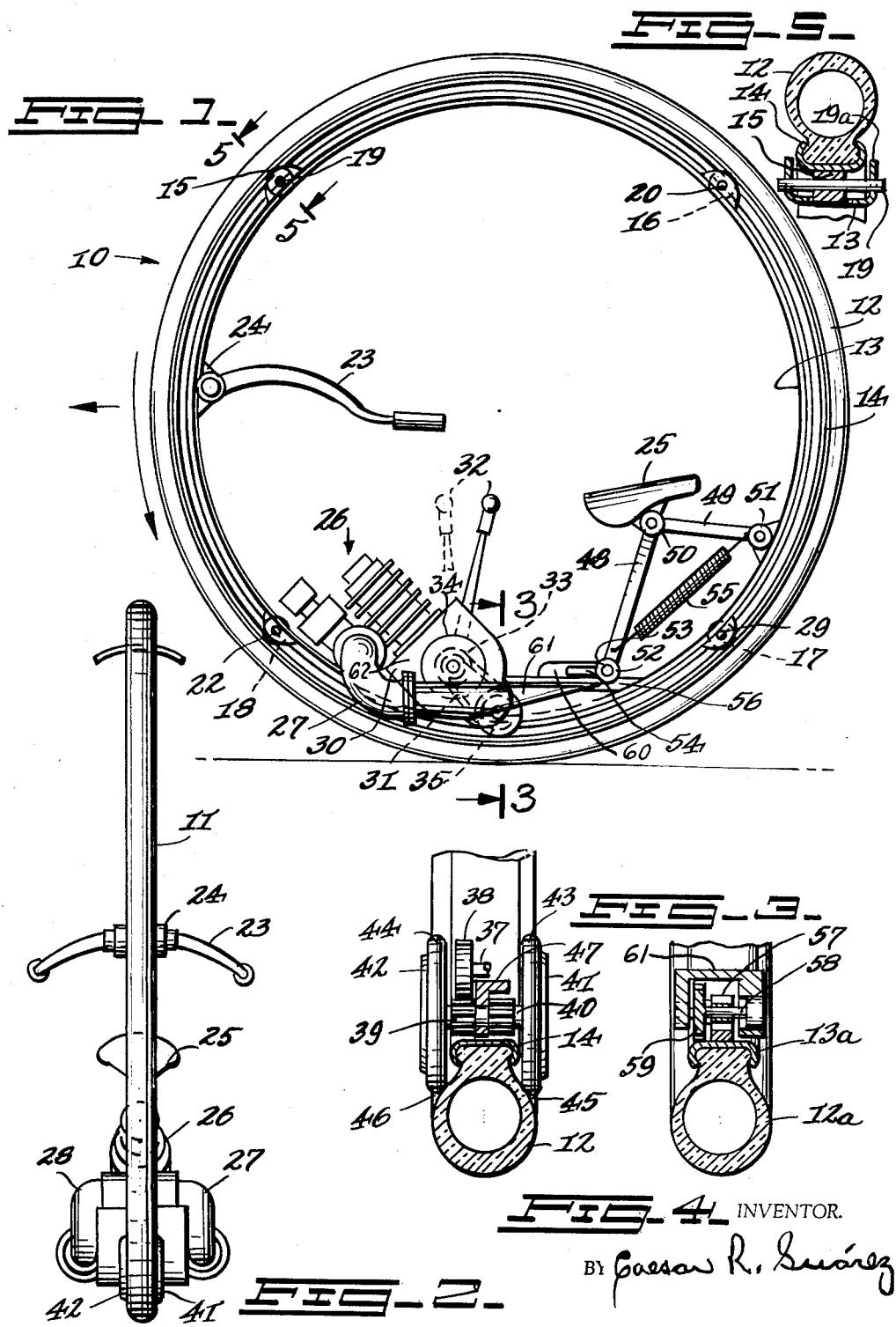
INVENTOR.
BY Caesar R. Suárez

3,260,324
MOTORIZED UNICYCLE
Caesar R. Suarez, P.O. Box 5702 Annex Station,
Tucson, Ariz.
Filed Nov. 12, 1963, Ser. No. 322,700
1 Claim. (Cl. 180—10)

The present invention relates to motor driven vehicles, and more particularly it relates to a monocycle which may be provided with one single wheel instead of the conventional two wheeled vehicles.

It is conventional practice to furnish a motor-cycle with a pair of wheels; a front and a rear wheel. In the case of bicycles the rear wheel is driven by means of a pair of pedals, and in the case of motorcycles the rear wheel is driven by means of an internal combustion engine. In the present invention instead of providing a front and a rear wheel, I provide one wheel within or inside the other wheel. In my case the wheels in question are oversized and the rider is not traveling the cycle astride, but is instead riding inside the inner rim of the double wheels. My unicycle may be provided with a handle-bar and a driver's seat and its outer wheel may be fitted with a conventional rubber tire or a balloon tire. The combustion engine driving the unocycle may be provided with all the necessary instruments and devices necessary to stop the engine, a gear box to control the speed of the unicycle, and the gas exhaust ducts. The latter may extend rearwardly on either side of the centrally mounted wheels. The combustion motor may be mounted inside the wheels in a substantially inclined position to lower the center of gravity, and the rider's seat may be mounted on compression springs to permit the rider to adjust his center of gravity when taking curves at high speed.

Another object of this invention is to provide a unicycle of the class described with an inner and an outer wheel, with the later mounted to rotate upon the inner wheel which also forms the frame of the vehicle.

A further object of this invention is to provide roller means for mounting the outer wheel upon the inner wheel, and combustion engine means to drive the outer wheel.

An additional object of this invention is to mount a balloon tire upon the outer wheel in the unicycle, and to provide means for driving said out wheel by an internal combustion engine which is mounted to the inner wheel or the frame of the vehicle.

A further object of this invention is to provide friction means for driving the outer wheel directly from the internal combustion engine mounted upon the inner wheel.

Another object of this invention is to provide an internal gear to drive the outer wheel indirectly from the combustion engine mounted upon the inner wheel.

A further object of this invention is to provide flexible spring means to mount the driver seat directly to the inner wheel and in such a manner as to facilitate the lowering of the center of gravity by the driver when taking sharp turns at high speed.

This invention also consists in certain other features of construction, and the combination and arrangement of parts, to be hereinafter fully described, illustrated in the accompanying drawing, and specifically pointed out in the appended claims.

In describing the invention in detail, references will be made to the accompanying drawings where like character numerals denote liek or corresponding parts throughout the several views, in which:

FIG. 1 is a side elevational view showing the present invention;

FIG. 2 is a front elevational view of FIG. 1;

FIG. 3 is a section taken on the line 3—3 of FIG. 1;

FIG. 4 is a similar section of a modification; and

FIG. 5 is a section taken on the line 5—5 of FIG. 1.

It is to be understood that the present form of disclosure is merely for the purpose of illustration, and that there might be various modifications thereof, without departing from the spirit of the invention as herein set forth.

Referring now more particularly to the unicycle 10, best seen in FIG. 1, made in accordance with the present invention, and comprising, in combination, an outer wheel 11; a balloon tire 12; rim 13, of an inner wheel; rim 14, of the outer wheel; guiding rollers 15, 16, 17 and 18, respectively; roller shafts 19, 20, 21 and 22, respectively; handle-bar 23; handle bracket 24; driver seat 25; internal combustion engine 26; a pair of gas exhaust ducts 27 and 28, respectively; gear box 30; motor drive 31; and handle 32 to operate the gear box 30 to vary the speed.

Reference now being made specifically to the main or the motor drive 31, which comprises the internal combustion engine 26, it can be seen that by means of the endless link chain 33 and the pair of pulleys (or sprockets) 34 and 35, respectively, the friction drive pulleys may be rotated to turn the wheel 11. From FIG. 3 (which is a section taken on the line 3—3 of FIG. 1) it can be seen that by means of the pulleys 34 and 35 and the link chain 33, the shaft 37 may be driven; which in turn may drive the spur gear 38, which meshes with the spur gear 39. The latter is pinned to the shaft 40. On either end of the shaft 40, are held the large wheels 41 and 42, respectively, which may be provided with solid rubber rims 43 and 44, respectively, both in frictional contact with the tire 12, at 45 and 46 respectively. By means of the frictional contact between the tire 12 and the rubber rims 43 and 44, the wheel 11 is being rotated at a constant speed under the influence of the motor drive 26. It can be seen that the drive shaft 40 may be supported by the frame member 47, substantially as shown.

The seat 25 (see FIG. 1) may be mounted directly to the rim 13 of the inner wheel by means of the substantially vertical arm 48 and the horizontal fulcrum 49. The end of the fulcrum 49 and the arm 48 may be mounted together at 50 under the seat 25, while the opposite end of the fulcrum 49 is held to the swiveling bracket 51, with the opposite arm 52, by means of the pin 53 being free to slide lengthwise within the elongated slot 54 cut in the bracket 60, which is held to the floor section 56. The floor section 56 is held to the inner rim 13, substantially as shown. Under the influence of the coil spring 55 the free end 52 may slide in the slot 54 as desirable. One end of the support brackets 61 is secured to the floor section 56 and the other end of brackets 61 is affixed to the reinforced frame 62 of gear box 30.

Referring to FIG. 5 (which is a section taken on the line 5—5 of FIG. 1) it can be seen that the roller 15, by means of the shaft 19 is free to turn in the bracket 19a which is formed by the rim 13 of the inner wheel. The roller 15 contacts the steel retainer ring or the rim 14 of the outer wheel 11, substantially as shown. Thus brackets, such as, bracket 19a retain the inner wheel 14 within the outer wheel 11.

FIG. 4 shows a modification. In this case the rim 13a may support the balloon tire 12a which is carried by the inner gear. A spur gear 57 which is mounted to a shaft 58 and may be driven by the gear 59 is in mesh with the inner gear. By means of a chain drive (not shown) the gear 57 may be driven to operate the outer wheel 12a.

Having described my invention in detail, it becomes obvious that the manner of its operation is very simple. The rider mounts the seat 25 under the inner wheel 14.

The internal combustion engine 26 is started by the usual means, and the gear shift handle 32 is moved to "forward." By means of the handle 32 "2nd" and "3rd" speeds or "reverse" is clutched in, when desirable. The direction of my unicycle may be controlled by means of the handle-bar 23, and the driver who leans his weight one way or the other to influence the direction of the unicycle. If desirable, my unicycle may be provided with a bracket (not shown) to hold it upright when not in motion.

A careful examination of the foregoing description in conjunction with the invention as illustrated in the drawing, will enable the reader to obtain a clear understanding and impression of the alleged features of merit and novelty, sufficient to clarify the construction of the invention as hereinafter claimed.

Minor changes in shape, size and materials, and rearrangement of parts, may be restored to in actual practice, as long as no departure is made from the invention claimed.

Having described my invention, what I claim is the following:

A unicycle of the class described comprising in combination an outer wheel, and an inner wheel, said outer wheel comprising a circular rim having a baloon tire mounted thereupon, said inner wheel being contained within said outer wheel, said inner wheel comprising an inner rim having a plurality of radially outwardly extending brackets integrally formed on each lateral side of said rim, said brackets protruding radially outwardly and being adjacent each lateral side of said outer wheel rim, thereby retaining said inner wheel within said outer wheel, each of said brackets on each of said lateral sides being in alignment with a corresponding bracket on the opposite lateral side, a shaft between said brackets and a roller mounted rotatably free upon said shaft, said roller being in contact engagement with the inner edge of said outer wheel rim, an internal combustion engine secured to said inner rim, a gear drive on the output of said engine, a drive pulley connected to said gear drive connected by an endless chain to a drive pulley on a wheel shaft, said wheel shaft having a wheel at each end straddling said inner wheel, said wheels being in frictional contact with said tire of said outer wheel to provide drive means of said inner wheel respective to said outer wheel, a handle bar and a seat secured to said inner wheel for control and support respectively for a driver.

References Cited by the Examiner
UNITED STATES PATENTS

| | | |
|---|---|---|
| 2,107,766 | 2/1938 | Rose. |
| 2,686,571 | 12/1954 | Horste _____ 180—74 |

FOREIGN PATENTS

| | | |
|---|---|---|
| 573,801 | 3/1924 | France. |
| 930,306 | 9/1952 | France. |
| 11,719 | 1903 | Great Britain. |
| 275,647 | 7/1928 | Great Britain. |
| 474,483 | 9/1952 | Italy. |
| 27,138 | 7/1932 | Netherlands. |

LEO FRIAGLIA, *Primary Examiner.*